United States Patent
Kim

(10) Patent No.: US 9,920,813 B2
(45) Date of Patent: Mar. 20, 2018

(54) DYNAMIC DAMPER ASSEMBLY

(71) Applicant: Hyundai Motor Company, Seoul (KR)

(72) Inventor: Hyun Sick Kim, Seoul (KR)

(73) Assignee: Hyundai Motor Company, Seoul (KR)

( * ) Notice: Subject to any disclaimer, the term of this patent is extended or adjusted under 35 U.S.C. 154(b) by 0 days.

(21) Appl. No.: 15/258,182

(22) Filed: Sep. 7, 2016

(65) Prior Publication Data

US 2017/0268601 A1    Sep. 21, 2017

(51) Int. Cl.
*F16F 15/14*    (2006.01)
*F16F 7/108*    (2006.01)
*F16F 7/104*    (2006.01)

(52) U.S. Cl.
CPC .......... *F16F 15/1435* (2013.01); *F16F 7/108* (2013.01); *F16F 7/104* (2013.01); *F16F 15/1414* (2013.01); *F16F 2228/04* (2013.01); *F16F 2232/02* (2013.01)

(58) Field of Classification Search
CPC ........ F16F 7/104; F16F 7/108; F16F 15/1414; F16F 15/1435; F16F 2228/04; F16F 2232/02; Y10T 65/50; Y10T 74/2184
USPC ............... 188/378, 379, 380; 267/136, 140.3
See application file for complete search history.

(56) References Cited

U.S. PATENT DOCUMENTS

| | | | | |
|---|---|---|---|---|
| 4,736,701 A * | 4/1988 | Kondo | .......... | B63B 3/70 114/340 |
| 4,951,930 A | 8/1990 | Uno et al. | | |
| 5,056,763 A * | 10/1991 | Hamada | .......... | F16F 15/1442 188/379 |
| 5,593,144 A * | 1/1997 | Hamada | .......... | F16F 15/1442 188/379 |
| 5,660,256 A * | 8/1997 | Gallmeyer | .......... | F16F 15/1442 188/379 |
| 5,884,902 A * | 3/1999 | Hamada | .......... | F16F 7/108 180/381 |
| 6,308,810 B1 * | 10/2001 | Kuwayama | .......... | F16F 7/108 188/379 |
| 6,450,487 B1 * | 9/2002 | Kuwayama | .......... | F16F 15/1442 188/379 |
| 6,485,370 B1 * | 11/2002 | Kurosu | .......... | F16F 7/108 188/379 |
| 6,499,730 B1 * | 12/2002 | Kuwayama | .......... | F16F 7/108 188/379 |
| 6,550,754 B2 * | 4/2003 | Kuwayama | .......... | F16F 7/108 267/141.3 |
| 6,857,623 B2 * | 2/2005 | Kuwayama | .......... | F16F 7/108 267/141 |
| 6,883,653 B2 * | 4/2005 | Kato | .......... | F16F 15/1442 188/379 |
| 6,981,579 B2 * | 1/2006 | Kuwayama | .......... | F16F 15/1442 188/379 |

(Continued)

FOREIGN PATENT DOCUMENTS

| | | |
|---|---|---|
| JP | H02-154826 A | 6/1990 |
| JP | H02-154827 A | 6/1990 |

(Continued)

*Primary Examiner* — Thomas W Irvin
(74) *Attorney, Agent, or Firm* — Morgan, Lewis & Bockius LLP

(57) ABSTRACT

A dynamic damper assembly may include a plurality of bodies arranged at predetermined intervals on an outer peripheral surface of a drive shaft, and an elastic body formed to surround each of the bodies and fixing each body to the drive shaft.

7 Claims, 3 Drawing Sheets

(56) References Cited

U.S. PATENT DOCUMENTS

| | | | |
|---|---|---|---|
| 7,635,118 B2 * | 12/2009 | Hayashi | F16F 15/1442 267/141.2 |
| 8,038,540 B2 * | 10/2011 | Hoeks | F16F 15/1442 188/379 |
| 8,117,943 B2 * | 2/2012 | Manzoor | F16F 15/1428 464/73 |
| 8,136,646 B2 * | 3/2012 | Kuwayama | F16F 7/108 188/379 |
| 8,899,392 B2 * | 12/2014 | Kim | F16F 7/108 188/378 |

FOREIGN PATENT DOCUMENTS

| | | |
|---|---|---|
| JP | 2000-130501 A | 5/2000 |
| JP | 2010-164132 A | 7/2010 |
| JP | 2012-57701 A | 3/2012 |
| KR | 10-2007-0025666 A | 3/2007 |
| KR | 10-2007-0108670 A | 11/2007 |
| KR | 10-2015-0106638 A | 9/2015 |

* cited by examiner

DYNAMIC DAMPER ASSEMBLY

CROSS REFERENCE TO RELATED APPLICATION

The present application claims priority to Korean Patent Application No. 10-2016-0033391, filed Mar. 21, 2016, the entire contents of which is incorporated herein for all purposes by this reference.

BACKGROUND OF THE INVENTION

Field of the Invention

The present invention relates to a dynamic damper provided in a drive shaft of a vehicle to reduce booming noise occurring when a bending mode of the drive shaft coincides with an excitation frequency of an engine, and, more particularly, to a dynamic damper assembly capable of reducing noise in a multi-frequency band even though only one dynamic damper is mounted to a drive shaft.

Description of Related Art

In general, vibrations occur in a structure or a device when an external force is applied thereto, regardless of whether the structure or the device has or does not have its own power.

For example, when an external force is applied to a device for generating power by transferring explosive power from a four-stroke engine of a vehicle to drive wheels through drive shafts via a transmission, or a structure which does not have its own power, vibrations occur in the device or the structure. These vibrations deteriorate the mounting safety of the engine or structure, and cause interference when the components or related parts thereof are operated, which may lead to the deterioration of accuracy or the risk of malfunction.

The drive shafts for transferring such a driving force are installed between the transmission fixed to a frame and the drive wheels fixed to chassis springs. For this reason, the drive shafts cause bending vibrations such as torsion and whirling, and the explosive vibration of the engine is applied to the drive shafts.

Particularly, a differential is one-sided in a Front-engine Front-drive (FF) vehicle, with the consequence that a Left Hand (LH) drive shaft has a short length and a Right Hand (RH) drive shaft has a long length, as illustrated in FIG. 1. Accordingly, the RH shaft has a low bending natural frequency due to the long length thereof, and booming noise thus occurs when the RH shaft resonates in the excitation range of an engine.

In order to attenuate a resonant frequency and improve Noise, Vibration and Harshness (NVH), a dynamic damper is mounted to the drive shaft. However, since a typical dynamic damper is set to attenuate a single frequency, a secondary anti-resonant phenomenon may occur before and after the frequency attenuated by the dynamic damper.

In order to reduce such secondary anti-resonance, vehicles use dampers made of a material having a relative large loss factor. However, there is a limit to the attenuation of anti-resonance using such materials, and a desired frequency may be offset in a low-temperature region (at a temperature equal to or less than 0° C., or in a cold region) since the rate of change in natural frequency is increased according to a change in temperature. In addition, two dynamic dampers may be mounted to a vehicle in which a considerable degree of secondary anti-resonance occurs, but this is disadvantageous in terms of increases in weight and cost.

The information disclosed in this Background of the Invention section is only for enhancement of understanding of the general background of the invention and should not be taken as an acknowledgement or any form of suggestion that this information forms the prior art already known to a person skilled in the art.

BRIEF SUMMARY

Various aspects of the present invention are directed to providing a dynamic damper assembly capable of improving NVH of a vehicle and suppressing increases in weight and cost by attenuating a secondary anti-resonance due to the attenuation of a multi-frequency or by simultaneously primary and secondary bending modes, even by only one damper.

According to various aspects of the present invention, a dynamic damper assembly may include a plurality of heavy bodies arranged at predetermined intervals on an outer peripheral surface of a drive shaft, and an elastic body formed to surround each of the heavy bodies and fixing each heavy body to the drive shaft.

Masses of the heavy bodies are different based on at least one of varied radial thicknesses and arc lengths of the heavy bodies.

Distances from a center of rotation of the drive shaft to outer peripheral surfaces of each elastic body surrounding the respective heavy body are equal to each other.

Each elastic body surrounding the respective heavy body may have a same size.

A resultant of centrifugal forces of the heavy bodies may be set to be "0".

A slit hole may be formed between adjacent heavy bodies.

The slit hole may include one or more connection portions to connect the adjacent heavy bodies.

The elastic body may have seating portions formed with ends in a longitudinal direction of the drive shaft extending outward.

The drive shaft and inner and outer peripheral surfaces of the elastic body may form a concentric circle.

As apparent from the above description, in accordance with the dynamic damper assembly, the conventional integrated heavy body is divided into a plurality of pieces so that these pieces have different masses, and the resultant of the centrifugal forces of the respective heavy bodies is set to be "0". Thereby, it is possible to realize the dynamic damper assembly having an attenuation effect on multi-frequency by eliminating rotating unbalance.

Accordingly, it is possible to further improve NVH of the vehicle by attenuating the secondary anti-resonant region caused due to attenuation by the conventional dynamic damper. In addition, it is possible to control the resonance due to the primary bending mode of the drive shaft and various responses in the peripheral system of secondary anti-resonance before and after the bending mode. In addition, it is possible to reduce weight and costs compared to methods of additionally mounting dynamic dampers in order to improve NVH.

It is understood that the term "vehicle" or "vehicular" or other similar terms as used herein is inclusive of motor vehicles in general such as passenger automobiles including sports utility vehicles (SUV), buses, trucks, various commercial vehicles, watercraft including a variety of boats and ships, aircraft, and the like, and includes hybrid vehicles, electric vehicles, plug-in hybrid electric vehicles, hydrogen-powered vehicles and other alternative fuel vehicles (e.g., fuel derived from resources other than petroleum). As referred to herein, a hybrid vehicle is a vehicle that has two or more sources of power, for example, both gasoline-powered and electric-powered vehicles.

The methods and apparatuses of the present invention have other features and advantages which will be apparent from or are set forth in more detail in the accompanying drawings, which are incorporated herein, and the following Detailed Description, which together serve to explain certain principles of the present invention.

It should be understood that the appended drawings are not necessarily to scale, presenting a somewhat simplified representation of various features illustrative of the basic principles of the invention. The specific design features of the present invention as disclosed herein, including, for example, specific dimensions, orientations, locations, and shapes will be determined in part by the particular intended application and use environment.

DETAILED DESCRIPTION

Reference will now be made in detail to various embodiments of the present invention(s), examples of which are illustrated in the accompanying drawings and described below. While the invention(s) will be described in conjunction with exemplary embodiments, it will be understood that the present description is not intended to limit the invention (s) to those exemplary embodiments. On the contrary, the invention(s) is/are intended to cover not only the exemplary embodiments, but also various alternatives, modifications, equivalents and other embodiments, which may be included within the spirit and scope of the invention as defined by the appended claims.

Figure 1:
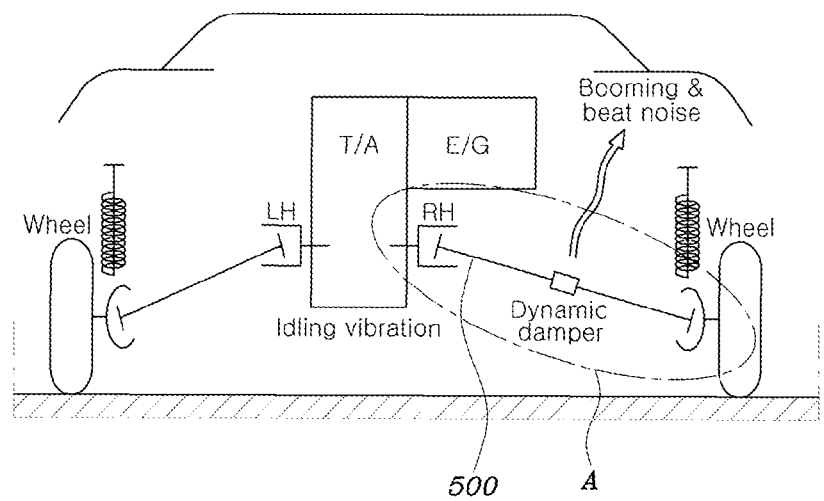
FIG. 1 is a view schematically illustrating a structure of a typical vehicle.
Figure 2:
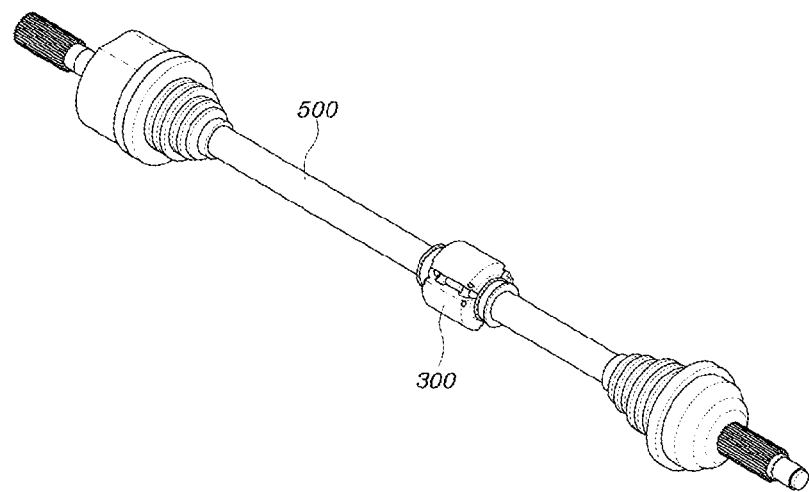
FIG. 2 is an enlarged view illustrating portion "A" of FIG. 1, and is a view illustrating a state in which a dynamic damper assembly is mounted to a drive shaft according to various embodiments of the present invention.
Figure 3:
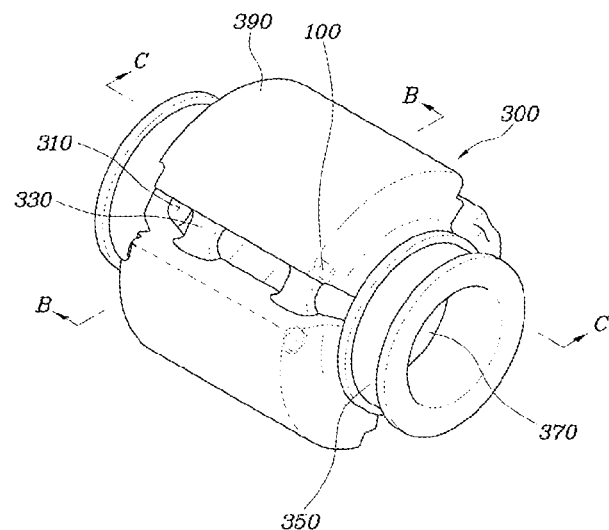
FIG. 3 is a view illustrating the dynamic damper assembly of FIG. 2.
Figure 4:
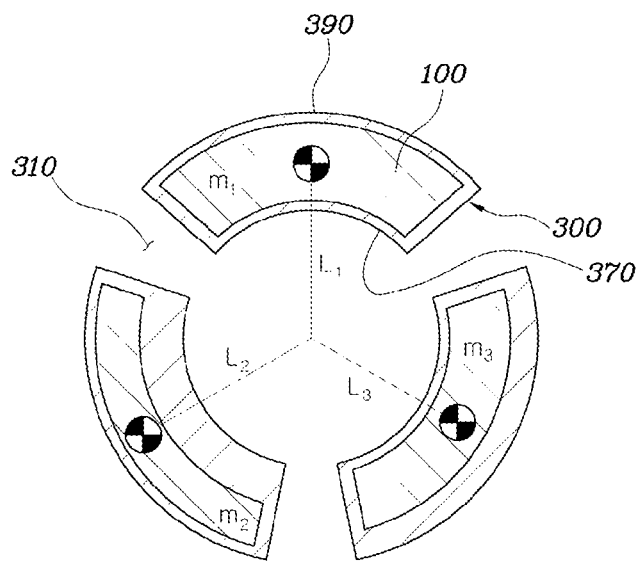
FIG. 4 is a cross-sectional view taken along line "B-B" of FIG. 3.
Figure 5:
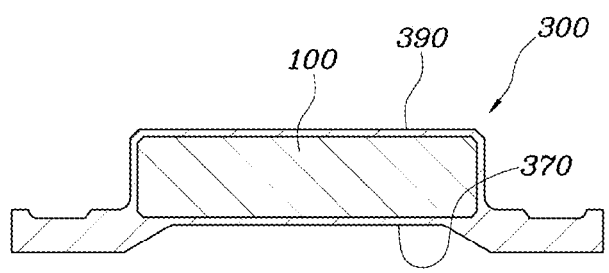
FIG. 5 is a cross-sectional view taken along line "C-C" of FIG. 3.
Figure 5:
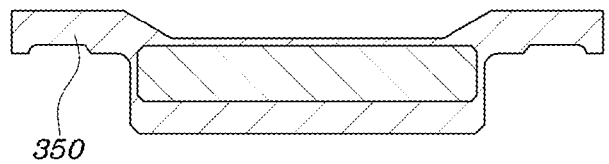

FIG. 1 is a view schematically illustrating a structure of a typical vehicle. FIG. 2 is an enlarged view illustrating portion "A" of FIG. 1, and is a view illustrating a state in which a dynamic damper assembly is mounted to a drive shaft 500 according to various embodiments of the present invention. FIG. 3 is a view illustrating the dynamic damper assembly of FIG. 2. FIG. 4 is a cross-sectional view taken along line "B-B" of FIG. 3. FIG. 5 is a cross-sectional view taken along line "C-C" of FIG. 3.

The dynamic damper assembly according to various embodiments of the present invention includes a plurality of heavy bodies 100 arranged at predetermined intervals on an outer peripheral surface 390 of a drive shaft 500, and an elastic body 300 which is formed to surround each of the heavy bodies 100 and fixes the heavy body 100 to the drive shaft 500. The elastic body 300 may be made of a rubber material, and each of the heavy bodies 100 may be formed in the associated elastic body 300 in a vulcanization manner and be formed by insert injection molding.

The typical heavy body provided in a dynamic damper is a single heavy body having a pipe shape that surrounds a drive shaft. However, the dynamic damper assembly of the present invention includes a plurality of heavy bodies 100 arranged at predetermined intervals on the outer peripheral surface of the drive shaft 500. The description thereof will be given in more detail with reference to FIGS. 3 to 5.

The overall shape of the heavy bodies 100 is a pipe shape that is radially spaced apart from the drive shaft 500 by a predetermined distance and surrounds the outer peripheral surface of the drive shaft 500, and the pipe shape includes a plurality of pieces which are longitudinally cut. In this case, a portion of the pieces as the heavy bodies 100 is removed, and one heavy body 100 is thus spaced apart from another heavy body 100 by a predetermined distance.

In particular, each of the heavy bodies 100 is surrounded by the associated elastic body 300. Accordingly, a slit hole 310 having a slit shape that is elongated in the longitudinal direction of the heavy bodies 100 is formed between one heavy body 100 and another heavy body 100. The slit hole 310 is provided with a connection portion 330 which is made of the same material as the elastic body 300 and circumferentially connects one heavy body 100 to another heavy body 100. The stiffness of the elastic body 300 may be more increased by the connection portion 330. Therefore, even when the rotational speed of the drive shaft 500 is rapidly changed, the torsion of the dynamic damper assembly is suppressed by the connection portion 330 so that the dynamic damper assembly has improved durability.

The elastic body 300 has seating portions 350 formed in such a manner that both ends thereof in the longitudinal direction of the drive shaft 500 extend outward. The seating portions 350 may each have a ring shape that surrounds the outer peripheral surface of the drive shaft 500. In particular, since the seating portions 350 are formed in such a manner that both ends of an inner peripheral surface 370 of the elastic body 300 extend in the longitudinal direction of the drive shaft 500, it is preferable to enhance the contact force between the drive shaft 500 and the elastic body 300. In addition, the drive shaft 500 and the inner and outer peripheral surfaces 370 and 390 of the elastic body 300 form a concentric circle, thereby preventing an excitation force from being generated due to the rotating unbalance of each portion during the rotation of the drive shaft 500.

In particular, the heavy bodies 100 are a plurality of pieces formed by longitudinally cutting the above-mentioned pipe shape, and have different masses by changing the radial thicknesses or arc lengths of the heavy bodies. Thus, each heavy body 100 is formed so as to exhibit an attenuation effect in a natural frequency region according to the weight thereof.

However, the elastic bodies 300 surrounding the heavy bodies 100 have the same size (that is, the total size of an elastic body and a heavy body is identical to that of another elastic body and another heavy body), as illustrated in FIG. 4. Accordingly, even when the heavy bodies 100 have different masses and the heavy bodies 100 themselves have different sizes, the elastic bodies 300 surrounding the heavy bodies 100 have the same size since the elastic bodies 300 compensate for the different sizes of the heavy bodies 100. Accordingly, the distances from the center of rotation of the drive shaft 500 to the outer peripheral surfaces 390 of the elastic bodies 300 surrounding the heavy bodies 100 are equal to each other, thereby preventing rotating unbalance from occurring during the rotation of the drive shaft 500.

In addition, since the heavy bodies 100 have different masses, the distances from the center of rotation of the drive shaft 500 to the centers of mass of the heavy bodies 100 are different from each other, which may lead to an excitation force due to rotating unbalance. Accordingly, it is possible to eliminate an excitation force due to rotating unbalance by appropriately adjusting the positions of the heavy bodies 100 in the respective elastic bodies 300 such that the resultant of the centrifugal forces is zero "0".

Such a structure will be illustratively described with reference to FIG. 4. Although three heavy bodies 100 are described in the specification, the number and shapes of heavy bodies may be changed according to design or environments, and are not limited thereto.

It is assumed that the masses of the respective heavy bodies 100 refer to $m_1$, $m_2$, and $m_3$. In this case, when the primary bending mode of the drive shaft 50 is attenuated through the heavy body $m_3$, it is necessary to offset a secondary frequency generated before and after the heavy body $m_3$. Therefore, the relationship of $m_1 > m_2 > m_3$ is established between the heavy bodies 100. The distances from the center of rotation of the drive shaft 500 to the centers of mass of the respective heavy bodies 100 are set to be $L_1$, $L_2$, and $L_3$. Here, each centrifugal force is obtained by Equation of $F=mL\omega^2$, where $\omega$ is the angular velocity, but in order to offset an excitation force generated due to rotating unbalance, the resultant of vector values of ml obtained by multiplying masses and radii of rotation must be set to be "0" in disregard of angular velocities w of rotation since they are the same. Accordingly, the relationship of $L_2 > L_3 > L_1$ is preferably established between the distances ($L_1$, $L_2$, and $L_3$). The case where this relationship is applied to two or more heavy bodies 100 is as follows.

$$\Sigma F = m_i L_i \omega^2 = 0 \quad \text{[Equation 1]}$$

In addition, the natural frequency of the dynamic damper according to various embodiments of the present invention is determined by the mass (m) of each inner heavy body 100, the hardness of rubber, which is a material of the elastic body 300, and the stiffness (k) by the connection portion 330. This is expressed by the following equation.

$$f_n = \frac{1}{2\pi}\sqrt{\frac{k}{m}} \quad \text{[Equation 2]}$$

That is, as seen from the above equations, the natural frequency of the dynamic damper assembly becomes high as the stiffness (k) is gradually increased and the mass (m) is gradually decreased. In the present invention, the conventional integrated heavy body is divided into a plurality of pieces so that these pieces have different masses, and the resultant of the centrifugal forces of the respective heavy bodies 100 is set to be "0". Thereby, it is possible to realize the dynamic damper assembly having an attenuation effect on multi-frequency by eliminating rotating unbalance.

Accordingly, it is possible to further improve NVH of the vehicle by attenuating the secondary anti-resonant region caused due to attenuation by the conventional dynamic damper. In addition, it is possible to control the resonance due to the primary bending mode of the drive shaft 500 and various responses in the peripheral system of secondary anti-resonance before and after the bending mode. In addition, it is possible to reduce weight and costs compared to methods of additionally mounting dynamic dampers in order to improve NVH.

For convenience in explanation and accurate definition in the appended claims, the terms "upper" or "lower", "inner" or "outer" and etc. are used to describe features of the exemplary embodiments with reference to the positions of such features as displayed in the figures.

The foregoing descriptions of specific exemplary embodiments of the present invention have been presented for purposes of illustration and description. They are not intended to be exhaustive or to limit the invention to the precise forms disclosed, and obviously many modifications and variations are possible in light of the above teachings. The exemplary embodiments were chosen and described in order to explain certain principles of the invention and their practical application, to thereby enable others skilled in the art to make and utilize various exemplary embodiments of the present invention, as well as various alternatives and modifications thereof. It is intended that the scope of the invention be defined by the Claims appended hereto and their equivalents.

What is claimed is:

1. A dynamic damper assembly comprising:
a plurality of bodies arranged in a peripheral direction of a drive shaft at predetermined intervals on an outer peripheral surface of the drive shaft; and
an elastic body formed to surround each of the bodies and fixing each body to the drive shaft,
wherein a slit hole having a slit shape that is elongated in a longitudinal direction of the bodies is formed between a first body and a second body of the bodies,
wherein masses of the bodies are different based on at least one of varied radial thicknesses and arc lengths of the bodies in the peripheral direction of the drive shaft, and
wherein a resultant of centrifugal forces of the bodies is set to be "0".

2. The dynamic damper assembly according to claim 1, wherein distances from a center of rotation of the drive shaft to outer peripheral surfaces of each elastic body surrounding the respective body are equal to each other.

3. The dynamic damper assembly according to claim 1, wherein each elastic body surrounding the respective body has a same size.

4. The dynamic damper assembly according to claim 1, wherein the slit hole is formed between adjacent bodies.

5. The dynamic damper assembly according to claim 4, wherein the slit hole comprises at least one connection portions to connect the adjacent bodies.

6. The dynamic damper assembly according to claim 1, wherein the elastic body has seating portions formed with ends in a longitudinal direction of the drive shaft extending outward.

7. The dynamic damper assembly according to claim 1, wherein the drive shaft and inner and outer peripheral surfaces of the elastic body form a concentric circle.

* * * * *